Jan. 6, 1931.  E. L. ANDERSON  1,787,653
FAN VOLUME AND PRESSURE CONTROL
Filed May 11, 1929   3 Sheets-Sheet 1

INVENTOR
EDWARD L. ANDERSON.
BY Toulmin & Toulmin
ATTORNEYS

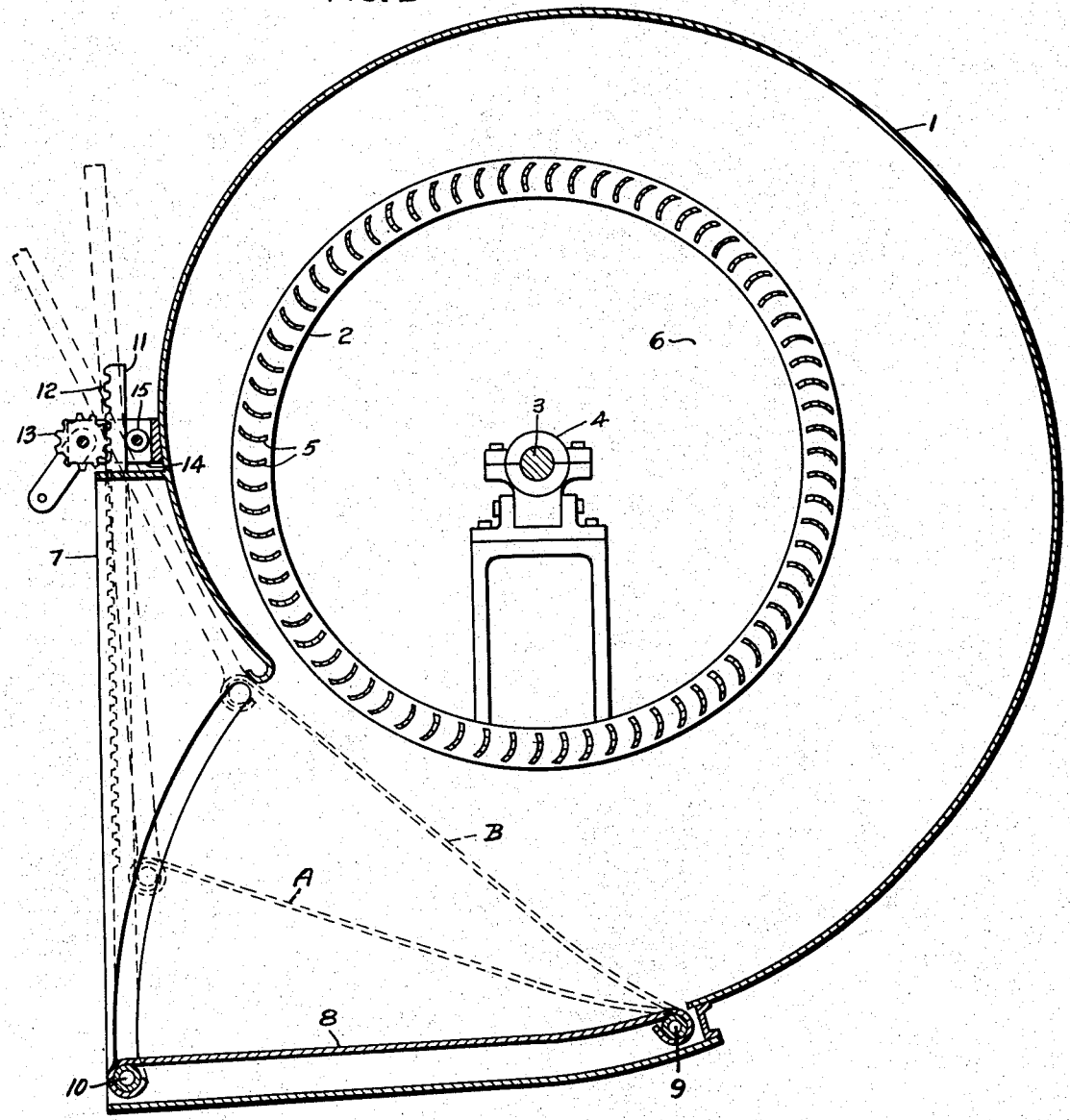

Jan. 6, 1931.  E. L. ANDERSON  1,787,653
FAN VOLUME AND PRESSURE CONTROL
Filed May 11, 1929  3 Sheets-Sheet 3
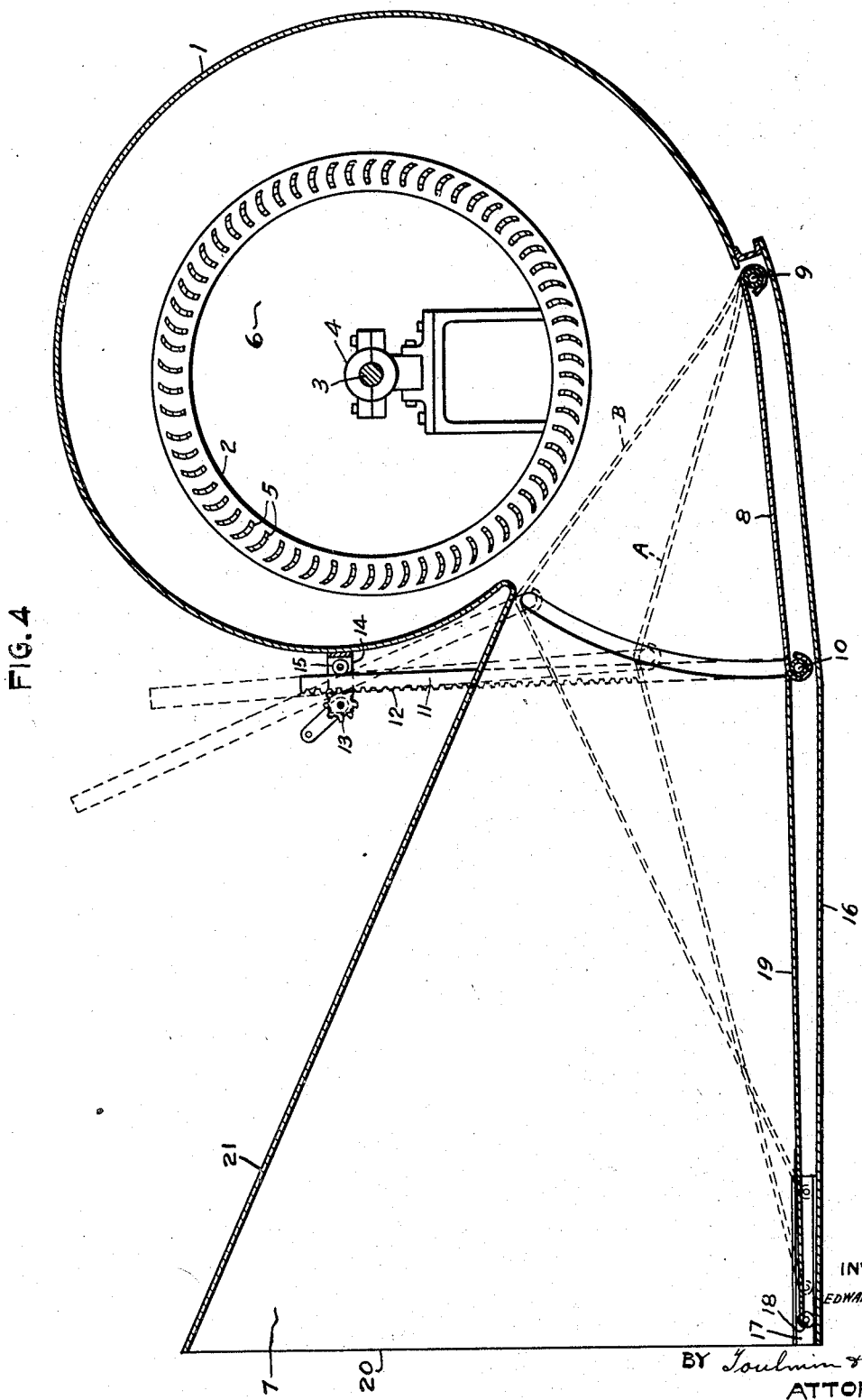

Patented Jan. 6, 1931

1,787,653

UNITED STATES PATENT OFFICE

EDWARD L. ANDERSON, OF GROSSE ILE, MICHIGAN, ASSIGNOR TO AMERICAN BLOWER CORPORATION, OF DETROIT, MICHIGAN, A CORPORATION OF DELAWARE

FAN VOLUME AND PRESSURE CONTROL

Application filed May 11, 1929. Serial No. 362,433.

The object of this invention is to provide certain improvements in sirocco fans.

It is more particularly the object of this invention to provide means for varying the volume and the pressure in the duct system of the fan, depending upon the position of a movable section of the scroll casing housing the fan.

This invention is carried out by providing in the outlet a damper or gate that may be adjusted to vary the outlet passage and the volume of air and the cross section area of the air passing through the outlet. By this means the pressure and the volume of the air in the duct may be so regulated in regard to the pressure of the outside air that there will be no tendency of the outside air to flow into the fan and reenter the duct and create eddies, and thereby produce a rattling or unpleasant noise in the operation of the fan.

It is also an object of this invention to provide means by which the stream of outgoing or incoming air may be controlled while the motor and the fan are operated at a constant rate of speed.

It is my object to eliminate variable speed motors, controllers and like expensive electrical equipment and to produce a variable flow from a constant speed fan while maintaining silent operation at reduced air volume of air delivered.

For the purpose of illustration there is shown in the accompanying drawings a preferred embodiment of this invention.

Referring to the drawings:

Figure 2 is a vertical section of the apparatus showing the casing, the fan and the single damper means for controlling the exit passage for the air.

Figure 4 is a section of the apparatus with double damper.

Figure 3:
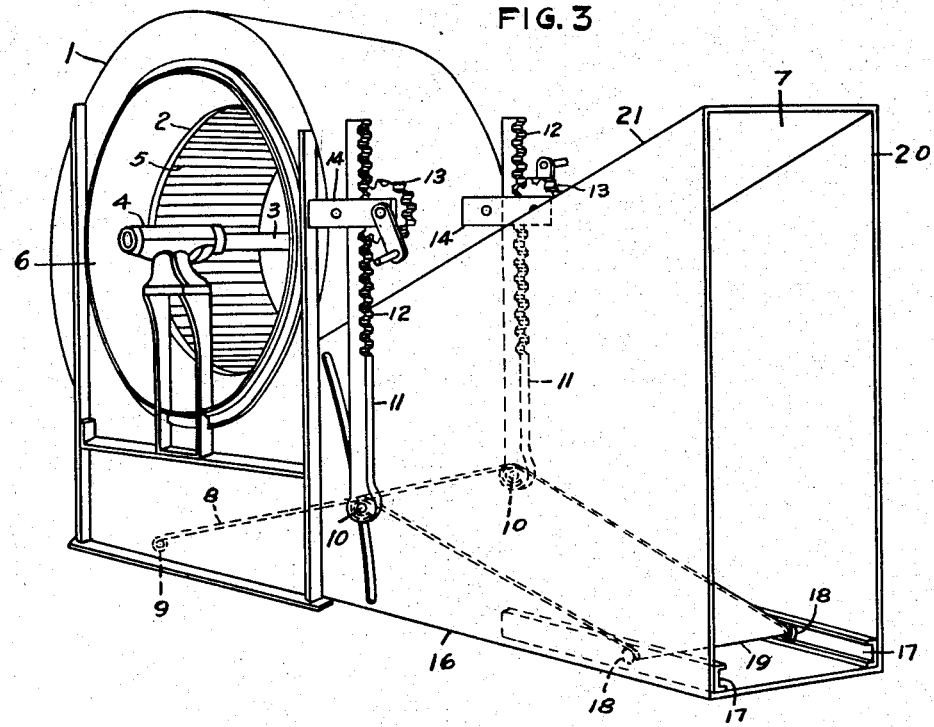
Figure 3 is a perspective of the apparatus with double damper.
Figure 1:
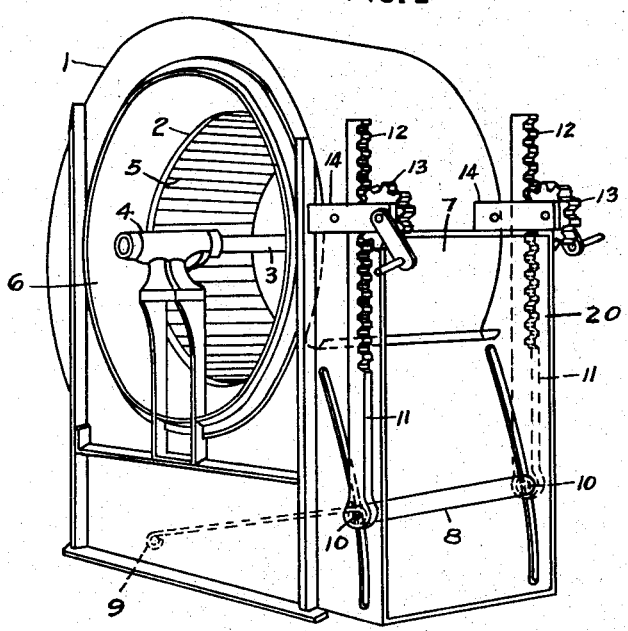
Figure 1 is a perspective of the apparatus showing the inlet passage for the air with single damper.

The numeral 1 is used to designate the fan casing as a whole, which is convolute in form, as clearly shown in Figure 2. Within this casing there is suitably mounted a fan indicated by the numeral 2, which is suitably supported by an axle or shaft 3 on bearings 4. The fan is circular in shape and has on the outer periphery thereof blades 5.

The circular intake passage of the fan is indicated by the numeral 6, while the outlet passage is indicated by the numeral 7. The extent of the outlet passage may be controlled by a damper 8, suitably supported on the lower part of the convolute casing at a point indicated by the numeral 9, and is adapted to swing about this point for the purpose of adjustment.

To the other end of the damper there are pivotally mounted at the pivot point 10 bars 11. The upper ends of these bars have rack teeth 12, which are adapted to be engaged by the teeth of the pinion 13 supported in suitable brackets attached to the side of the casing and indicated by the numeral 14. There are also provided in these brackets guide rollers 15, which engage the parts of the rack bars opposite to the teeth and cooperate with the pinions in holding the bars in engagement with the pinions.

The lower part of the fan casing that defines the lower wall of the exit is continued, as indicated by the numeral 16, and has provided in its lateral sides, near the ends thereof, slots 17 which serve to guide rollers 18 mounted on the outer end of a supplemental damper 19. This supplemental damper 19 is pivotally mounted on the outer end of the inner damper, and is adapted to be raised and adjusted therewith for the purpose of varying the extent of the exit opening. As the inner end of the outer damper is raised the rollers on the outer end of the damper roll within the slots heretofore mentioned. This outer section of the damper acts as a readjustment to the air angles for direction of flow, and will increase the efficiency in low inclosures.

Cooperating with the extension 16 for the purpose of forming the duct system beyond the outlet there are provided side walls indicated by the numeral 20, and an upper upwardly directed wall indicated by the numeral 21. This structure gives the outer duct system a funnel shaped appearance, with the smaller end near the fan casing proper. The upper wall extends from a point a little above the lower surface of the fan wheel and at a point to which the damper can be raised for completely shutting off the exit opening.

By means of the rack and pinion the dampers may be regulated so as to partially close or completely close the exit opening from the fan casing. In Figure 2 the dampers are shown in two positions, A and B. In the A position the exit passageway is only partly closed while in the B position the passageway is completely closed. These two positions are used by way of illustration. The dampers may be placed anywhere between complete closure and complete opening.

By this funnel or bell shaped structure the back pressure of the air can be so controlled in relation to the pressure of the outgoing air that no air from the bell shaped duct can reenter the fan and produce noise and retard the action of the fan. This is accomplished by regulating the outlet passage in such a way that the pressure of the outgoing air is greater than that of the air accumulated in the bell part of the outer duct.

As the fan rotates the air is drawn in through the inlet opening and passes around through the convolute casing and out at the exit opening. It frequently happens in the operation of fans of this type that, due to back pressure and resulting eddies, the fan rattles and produces an unpleasant hissing or droning noise, and it is for the purpose of preventing this noise that this improvement is made. By means of this damper the capacity of the outlet passage may be varied and the volume, density and pressure of the outgoing air varied also.

The volume and pressure are reduced in the duct system beyond the outlet depending upon the position of the movable or damper section of the scroll just mentioned. This is an advantage of moving the peak of the pressure in the system from a large to a comparatively small ratio of opening at the same time. Thus, in applying this device to a sirocco type of fan in which the peak of the operation when wide open occurs at about 20,000 cubic feet of air per minute, giving a pressure of 2.85″ static when operation at approximately 500 revolutions per minute, closing the volume and pressure controller 25 per cent. will slightly increase the static pressure to 2.95″, but this peak of operation would occur at 12,000 cubic feet instead of 20,000. A further closure of the valve would further reduce the static pressure at lower volumes, and can be carried on this basis to a fully closed exit if desired.

Another advantage of this type of control is that the horse power requirement for the fan is reduced substantially in a direct proportion to the volume furnished. The advantages of this control lie in the fact that, should a fan be operated in what is termed the drop or low point of the curve, which in the above example would be about 11,000 cubic feet per minute, with the damper wide open, and the air should, as under normal circumstances, reenter the fan and cause an interruption of the air inlet flow with consequent noise and loss of efficiency. This noise and loss of efficiency can be overcome by increasing the velocity at this section of the scroll.

Thus it is possible to operate a large sirocco fan, one having a too great size for the duty required under normal circumstances upon such reduced duty as is required by the use of this volume controller, and without the general loss of efficiency which occurs during this operation or the increase of air noise in the fan, the fan thus being as quiet, if not quieter, when working under dampered or reduced volume and pressure as when operating under the most advantageous point of relation of pressure to speed.

I desire to comprehend within my invention such modifications as may be clearly embraced within my claims and the scope of my invention.

Having thus fully described my invention, what I claim as new and desire to secure by Letters Patent, is:

1. In a fan having a scroll casing with inlet and outlet passages, a fan in said casing, a jointed damper means in said outlet passage adapted to incline both in and out of said casing to vary the size of said passage, and means attached to said damper for adjustment.

2. In a fan, a scroll casing having an inlet and an outlet passage, a fan in said casing, a damper member in said outlet passage forming one wall of the passage adapted to restrict said passage, and a second damper member permanently attached to the first member and adapted to cooperate with said first member in correcting the flow of air by always moving with the first damper by reducing the size of the outlet passage while forming a wall thereof.

3. In a fan, a scroll casing having an inlet and outlet passage, a fan in said casing, an extension on said outlet, a damper member in said outlet passage adapted to restrict said passage, and a second damper member pivotally attached to the first named member and slidably supported by said extension.

4. In a fan, a scroll casing having an inlet and outlet passage, a fan in said casing, an extension on said casing adjacent the outlet passage, a damper member pivoted at one end to said casing, a second damper member pivoted at one end to the first damper member and slidably supported at its other end on said extension, and means for elevating said damper members to restrict said outlet passage.

5. In a scroll casing having an outlet passage, a fan in said casing, and a jointed damper forming a wall thereof in said outlet passage adapted to restrict said passage.

6. In a scroll casing having an outlet passage, a fan in said casing, a jointed permanently pivoted damper member pivotally supported at one end in said outlet passage and slidably supported at the other end, and means to adjust said damper to vary the size of the outlet passage.

7. In a scroll casing having an outlet passage, a fan in said casing, an extension on said casing having guideways therein, a damper member pivoted at its inner end to said casing, a second damper member pivotally attached at one end to the outer end of the first damper member and supported at its other end in the guideways, and means to operate said damper members to vary the outlet passage, said dampers forming one wall of the outlet passageway and being adapted to vary the size of that passageway.

8. In a scroll casing having an outlet passage, a fan in said casing, an extension on said casing having guideways therein, a damper member pivoted at its inner end to said casing, a second damper member pivotally attached at one end to the outer end of the first damper member and supported at its other end in the guideways, and rack and pinion means to operate said damper members to vary the outlet passage, said dampers forming one wall of the outlet passageway and being adapted to vary the size of that passageway.

9. In a fan, a casing having an inlet and a venturi outlet, and means to vary the throat of said venturi outlet to control the effect of the back pressure of the outside air upon the outgoing air, said means forming one wall of the outlet and being adapted to vary the size of that outlet by varying the throat thereof through the movement of said wall.

10. In a fan, a scroll casing for said fan having a venturi outlet, a double damper in said outlet to vary the size of the outlet to vary the volume and speed of the outgoing air and prevent the back flow of outside air, and means to adjust said damper, said dampers forming one wall of said outlet and by their movement varying the size of the outlet.

11. In a fan, a scroll casing for said fan having a relatively long outlet with an upward directed upper wall, means to vary the incline of the lower wall of said outlet, and means to gradually reduce the passageway for the air leading to the outlet.

12. In a fan, a scroll casing having an inlet and an outlet, said outlet having one wall extending substantially at a tangent to the casing, and another and opposite wall extending in a line substantially at a tangent to the fan but diverging from the first wall, and a two-part jointed damper member pivoted at one end to said first named wall.

13. In a fan, a scroll casing having an inlet and an outlet, said outlet having one wall extending substantially at a tangent to the casing and another and opposite wall extending in a line substantially at a tangent to the fan but divergent to the first wall, and a jointed damper member pivoted at its inner end to said first named wall and supported thereon at its other end by rollers.

14. In a fan, a scroll casing having an inlet and an outlet, said outlet having one wall extending substantially at a tangent to the casing but offset slightly therefrom and another and opposite wall extending in a line diverging from the first named wall, and a damper formed of two sections pivoted together, the free end of one section being pivoted to the first named wall adjacent the offset and the free end of the other section supported on said first named wall by means of rollers.

15. In a fan, a scroll casing having an inlet and an outlet, said outlet having one wall extending substantially at a tangent to the casing but slightly offset therefrom and another and opposite wall extending in a line diverging from the first named wall, a damper formed of two sections pivoted together, the free end of one section being pivoted to the first named wall adjacent the offset and the free end of the other section supported by means of rollers on the first named wall, and means to bend up said damper whereby said rollers move inwardly and the outlet is restricted.

16. In a fan, a scroll casing with a center inlet and a tangential outlet, a fan in said casing, a damper forming one wall of the casing outlet, means for pivotally mounting the damper adjacent the inner end of the outlet, and means attached to the outer end of said damper to adjust it and vary the size of the outlet passageway by restricting the area of the outlet passageway without impeding the air flow therethrough through moving the outer end of the damper to and from the opposite wall of the casing about the dampers pivot.

In testimony whereof, I affix my signature.

EDWARD L. ANDERSON.